United States Patent [19]
Johnson et al.

[11] 3,874,836
[45] Apr. 1, 1975

[54] RECORD PRESS FOR DUPLICATING PRE-RECORDED RECORDS

[75] Inventors: Reynold B. Johnson, Palo Alto; Ronald D. Irvin, Los Gatos, both of Calif.

[73] Assignee: Education Engineering Associates, Palo Alto, Calif.

[22] Filed: Jan. 10, 1974

[21] Appl. No.: 432,316

[52] U.S. Cl. ............... 425/363, 264/107, 264/293, 425/810
[51] Int. Cl. ..................... B29d 17/00, B29g 7/02
[58] Field of Search .......... 425/363, 373, 810, 194; 264/106, 107, 293

[56] References Cited
UNITED STATES PATENTS

| | | | |
|---|---|---|---|
| 2,849,752 | 9/1958 | Leary | 264/293 X |
| 2,862,233 | 12/1958 | Brown | 425/810 X |
| 3,052,586 | 9/1962 | Brown | 425/810 X |
| 3,072,519 | 1/1963 | Salzman | 425/810 X |
| 3,113,905 | 12/1963 | Rosen | 425/810 X |
| 3,121,913 | 2/1964 | Hagmann et al. | 425/363 |
| 3,560,601 | 2/1971 | Johnson et al. | 264/293 X |

*Primary Examiner*—J. Howard Flint, Jr.
*Attorney, Agent, or Firm*—Flehr, Hohbach, Test, Albritton & Herbert

[57] ABSTRACT

A press for continuously pressing prerecorded records onto a substrate such as a single sheet or elongate web of thermal plastic material utilizes means including a stamper drum having pre-recorded records thereon, or (for recording on both sides of a substrate) both the drum and a cyclic stamper belt, the drum mounted for rotation for carrying the substrate therearound. Means for uniformly heating the substrate are provided along with means for directing same from the heating means onto the stamper drum for travel therewith. Means including an elongate resilient blanket serves to compress the heated substrate to the stamper drum to form images of the stamper records. A resilient cyclic belt means including the resilient blanket and having one stretch thereof trained in a predetermined cooling path so as to travel with the periphery of the drum while retaining the substrate compressed thereagainst. The cooling path is sufficiently long and the drum sufficiently heat absorptive to cause the images formed in the substrate to become set during their transit of the cooling path. The foregoing apparatus carries out a method following the steps of continuously moving while preheating the thermal plastic substrate, impressing the moving substrate with pre-recorded negative images while backing the substrate with a layer of resilient material to accommodate displacement of substrate material in the region of the records as they are pressed into the substrate, wrapping the resilient material to travel a cyclic path having a substrate-retaining portion traveling with the surface of a freely rotatable cooling drum carrying the pre-recorded negative images. Then leading the substrate to travel partially about the cooling drum throughout the substrate-retaining portion to retain the substrate to the drum. Finally, non-resilient, cyclic bands are applied under tension to press against the substrate via the blanket material substantially throughout its travel in the substrate-retaining portion. Rotating the drum to withdraw the tape serves to tension the substrate uniformly throughout its length during setting of the records on the substrate.

13 Claims, 12 Drawing Figures

FIG_1

FIG_2

FIG_3

FIG_4

FIG_5

FIG_6

FIG_7

FIG_8

FIG_9

FIG_12

FIG_11

RECORD PRESS FOR DUPLICATING PRE-RECORDED RECORDS

BACKGROUND OF THE INVENTION

This invention pertains to a record press for duplicating pre-recorded records and is particularly useful for duplicating pre-recorded records with audio, video or digital information indicia thereon. While this invention is useful in conjunction with the conventional sizes of recorded records, the invention will be described in conjunction with one of its applications, such as shown in our U.S. application, Ser. No. 347,841, where relatively small diameter micro-groove records are employed with a hand-held playback device.

SUMMARY OF THE INVENTION AND OBJECTS

In general, there has been provided a press for continuous pressing of pre-recorded records onto a web or other substrate of thermal plastic material employing a cyclically moving embossing drum carrying negative images of pre-recorded records to be applied to the substrate. Means for heating and continuously feeding the substrate to the embossing drum have further been provided along with means for pressing the substrate and the drum together to apply records to the substrate. Further, means for maintaining the substrate under tension and in secure registration contact with the embossed negative images carried on the drum prevent smearing of the record until the material of said web or other substrate has been permitted to set up to prevent smearing the record.

In general, it is an object of the present invention to provide an improved continuous embossing audio/video graphic press of the type described.

Another object of the invention is to provide an embossing machine for continuously stamping records in a manner whereby a heated substrate receives the record impressions while still in a pliant form and then the impressions are quickly set by a cooling surface applied thereto without smearing the recorded impressions.

It is yet another object to provide means for holding a freshly embossed web or other substrate securely while cooling the substrate to permit it to "set" without smearing of the embossed material impressed onto the substrate.

Another object of the invention is to provide an efficient record stamping system where substantially only the heat applied to the substrate is lost inasmuch as the stamper requires no heat.

Yet a further object of the invention is to provide a stamping system for stamping a substrate simultaneously on both sides.

The foregoing and other objects of the invention will be more clearly apparent from the following detailed description of preferred embodiments.

DETAILED DESCRIPTION OF PREFERRED EMBODIMENTS

In the following description, the substrate which receives the record pressings is shown for simplicity as a web 17 but individual page-sized sheets can be used as well.

Figure 1:
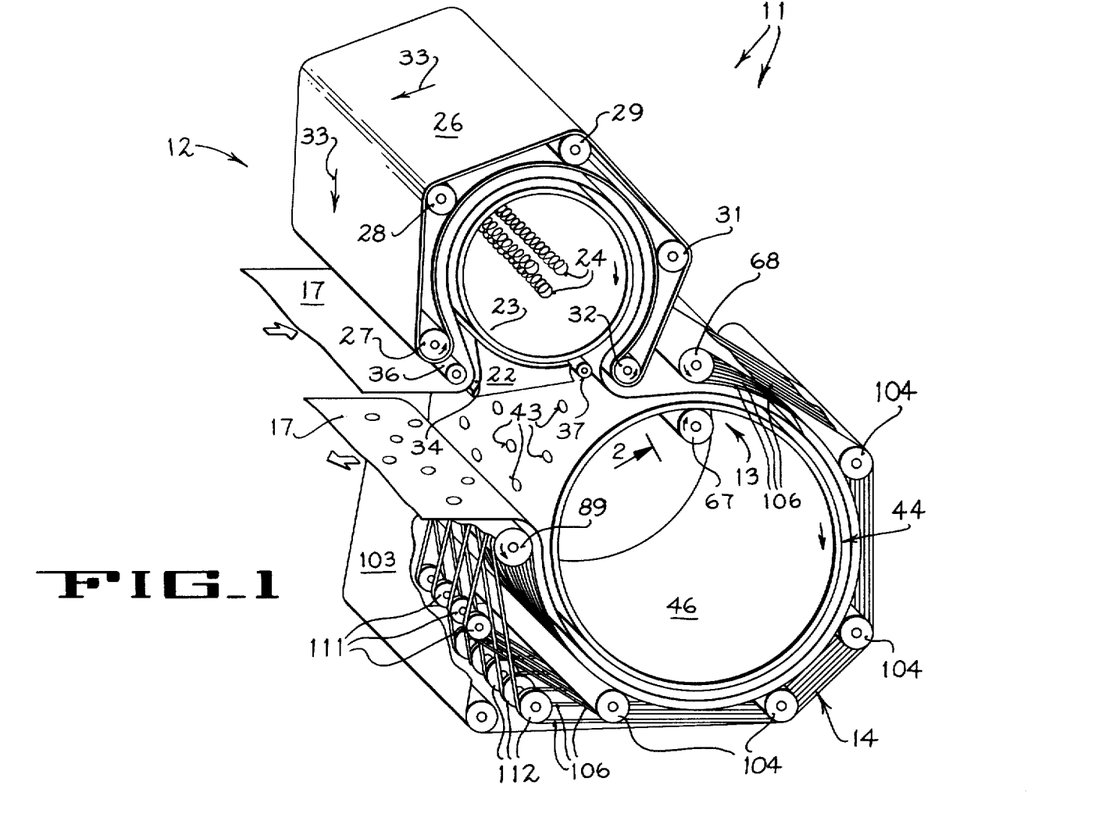
FIG. 1 shows a perspective diagrammatic exploded view of a machine, according to the invention, with covers and certain additional parts removed for clarity.
Figure 2:
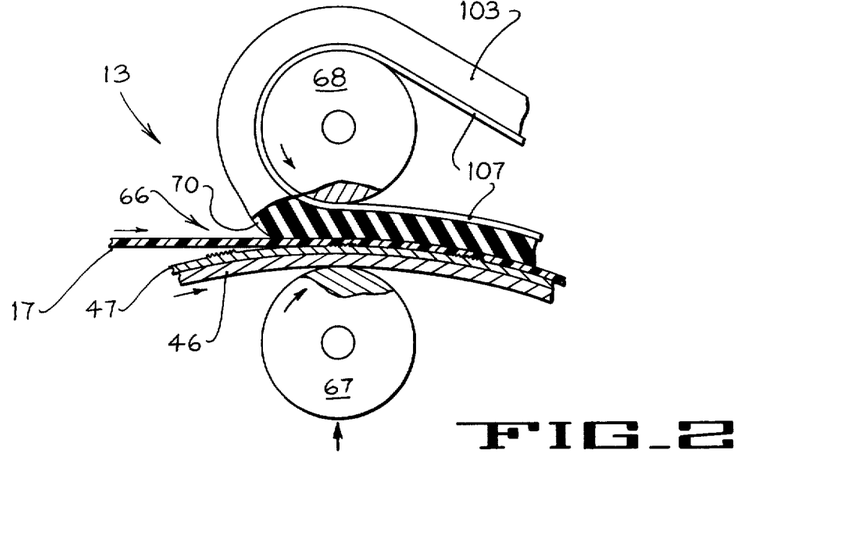
FIG. 2 shows an elevation view partially in section of an enlarged detail in the region identified by the bracket and reference numeral 2 as shown in FIG. 1.

Briefly, an embossing system 11 for stamping out micro-groove records of relatively small diameter as shown in FIG. 1 includes an oven assembly 12, an embossing assembly 13, a cooling and web-retaining assembly 14 and web-driving linkages 16.

In order to emboss micro-groove records onto a suitable plastic web 17, such as a thin web of PVC or other thermal plastic material on the order, for example, of 0.006 inches thick, the web must be heated to a suitable temperature whereby the web becomes plastic and subject to receiving impressions made by embossing means.

Figure 10:
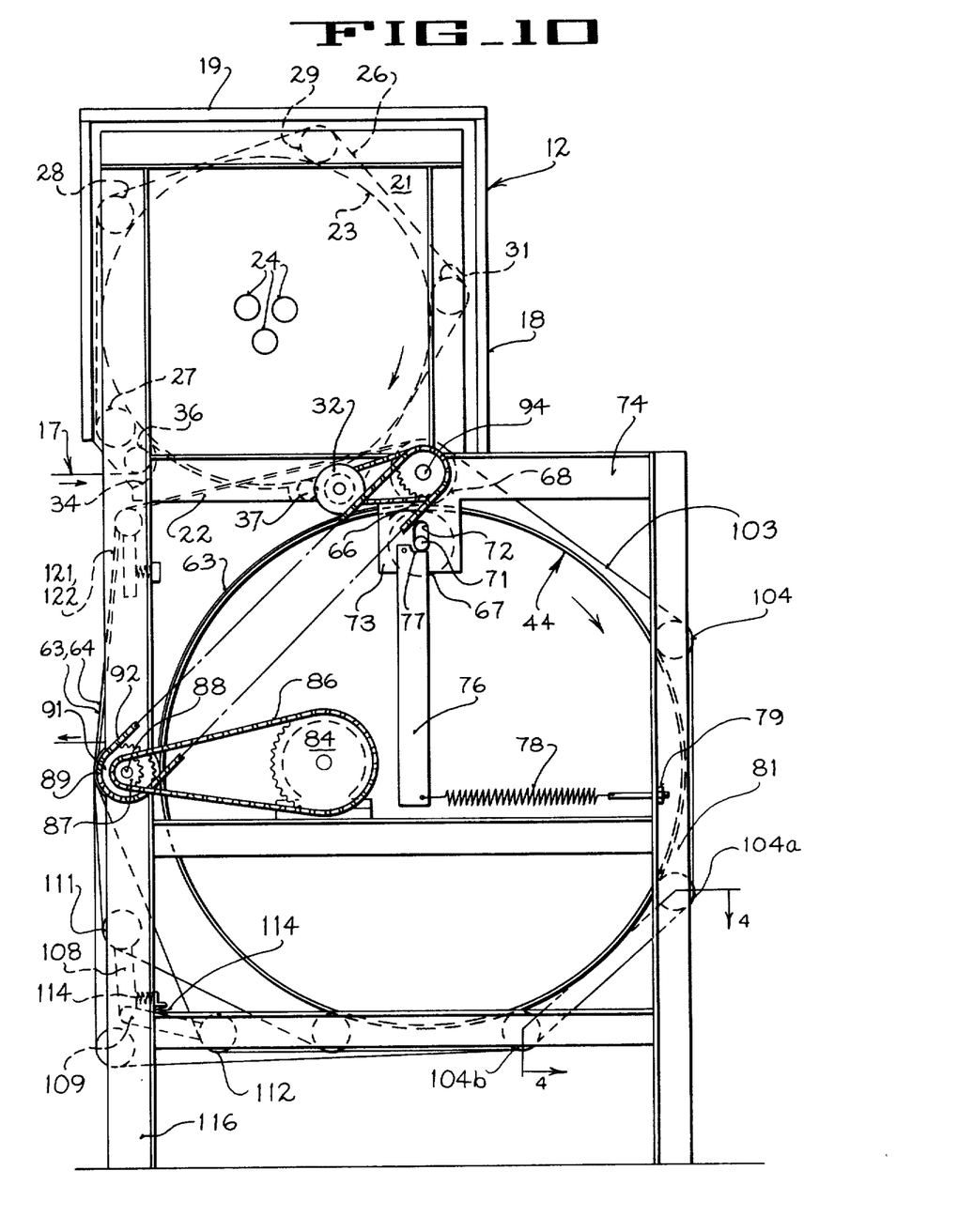
FIG. 10 shows an enlarged diagrammatic side elevation view of a press construction according to the invention.

Accordingly, as shown in FIGS. 1 and 10, an oven assembly 12 comprises an insulated enclosure formed of sides, top and end walls 18, 19, 21 all coated on their interior surfaces with a suitable reflective material for containing the heat within the oven enclosure. Oven assembly 12 includes an insulated bottom portion comprised primarily of the bottom wall 22 as will be described further below.

Oven assembly 12 includes a freely rotatable, thin, metallic drum or hoop 23 rotatably supported within the enclosure by means of a heating belt 26 of heat-resistant material, such as felt, Teflon or duct, and idler rollers 27, 28, 29, 31, 32 supported from the end walls 21 of oven assembly 21. Radiant heating elements 24 are mounted axially within drums in a stationary manner fixed to the end walls 21 to provide a uniform heating of the interior surface of drum 23 as it rotates.

Means for rotating drum 23 includes the cyclically driven heating belt 26 trained about the idler rollers.

The idler rollers define a cyclic path for belt 26 encompassing something on the order of 285° of the circumference of the heating drum 23. Belt 26 serves to hold web 17 firmly to drum 23 in heat transfer relation. The heating path around drum 23 is sufficiently long whereby web 17 emerges in a plastic state ready for receipt of embossing impressions.

Means for guiding web 17 into and out of oven assembly 12 includes the scoop-guide portion 34 of bottom closure 22 and guide roller 36 disposed to cooperate therewith and spaced slightly therefrom. Roller 36 is substantially non-conductive to heat and serves to guide the incoming web 17 into the nip defined between roller 27 and drum 23.

From that point, the inner reach of belt 26 holds web 17 securely to the surface of drum 23 for purposes of applying heat thereto via drum 23. At roller 32, web 17 emerges from oven assembly 12 into a different environment and is peeled from drum 23 (to the extent that web 17 might tend to stick or attempt to attach itself to drum 23) by means of a reversely rotating doctor roller 37 gear driven (FIG. 3) at one end by the gears 38, 39.

Figure 9:
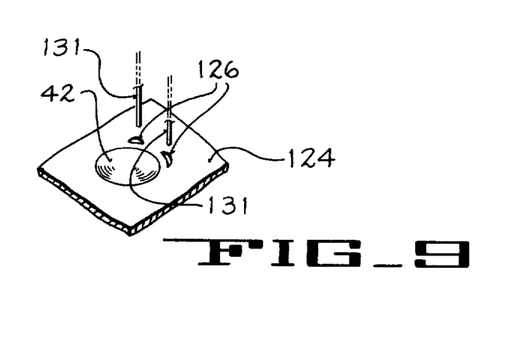
FIG. 9 shows, in perspective view, a record as ultimately formed on a layer of plastic material and including registration detents disposed to receive downwardly protruding index elements carried by a hand-held unit to be used in association with the record.

Relatively promptly after web 17 emerges from the environment of oven assembly 12 and while it is still in its pliant thermal plastic state, web 17 is impressed with means forming the micro-groove record 42 (FIG. 9). Accordingly, stamper units 47 carry a number of prepared negative images 43 of records 42 to be pressed into web 17.

Figure 3:
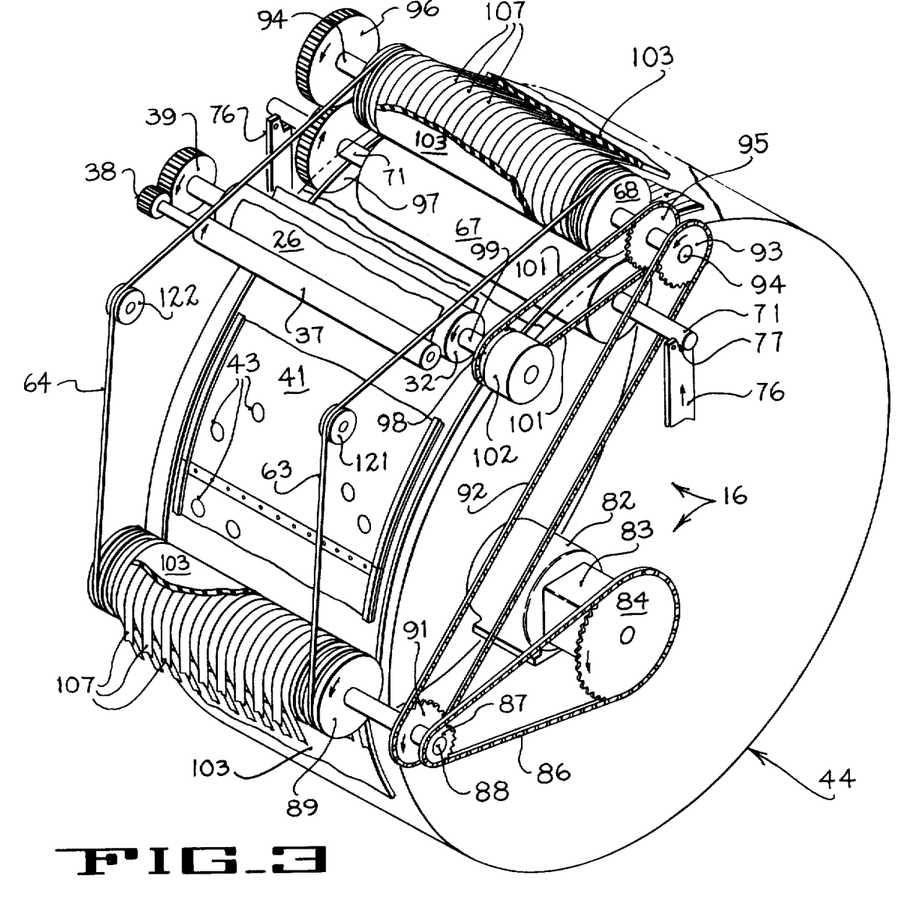
FIG. 3 shows a perspective view with portions broken away showing a stamper drum assembly according to the invention.

Accordingly, a stamper drum assembly 44 comprises a hollow, cylindrical, relatively thin hoop body 46 overlaid about its circumference with a number of arcuate stamper plates 47. Each plate 47 has been prepared on its outer face with embossed images 43 of records 42 to be manufactured.

Figures 5, 6, 7, 8:
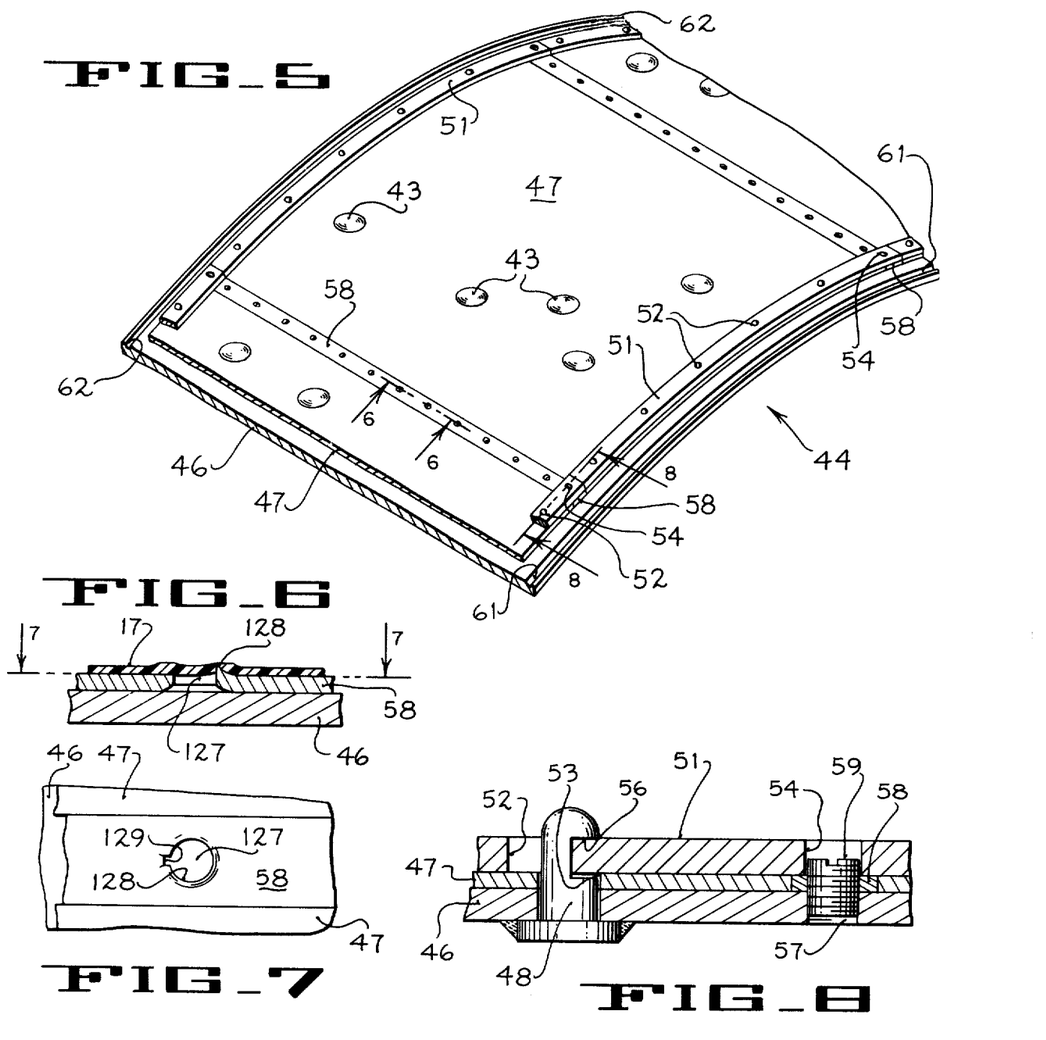
FIG. 5 shows an enlarged diagrammatic perspective view of a stamper element secured to a portion of an embossing drum carrier according to the invention.
FIG. 6 shows an elevation section detail view taken along the line 6—6 of FIG. 5.
FIG. 7 shows a plan view of FIG. 6 taken along the line 7—7 thereof.
FIG. 8 shows an enlarged section view of FIG. 5 taken along the line 8—8 thereof.

In general, stamper plates 47 are retained to the hoop body 46 by means of the retainer pins 48, screws 49, and keepers 51 cooperating therewith (FIG. 8).

Thus, the elongate keepers 51 are formed with a series of holes 52 spaced therealong for receiving keeper pins 48 permanently secured upwardly through the hoop body 46, through opening 53 formed in the edge margin of stamper plate 47. The endmost openings or holes 54 are slightly offset with respect to the other openings 52 whereby all openings 52, 53 can be aligned and keepers 51 disposed thereon. After making the alignment and inserting keeper pins 48 through the holes, keepers 51 are moved longitudinally a distance corresponding to something on the order of the radius of holes 52 so that the edge margin around opening 52 becomes captured in a notch 56 formed in each pin 48.

At that point, hole 54 becomes aligned with a threaded opening 57 extending through body 46 and also through a transversely extending tool strip or cutter strip 58 whereby a screw 59 can be threaded into engagement with strip 58 and body 57 with a portion of screw 59 extending upwardly into hole 54 to retain keepers 51 latched to pins 48.

It is to be understood that each stamper unit 41 produces a corresponding substrate portion or sheet (not shown). These sheets can be employed as pages in a book, for example, wherein each record 42 must be properly registered with printed material (visual or braille) associated immediately adjacent thereto such as words, phrases or pictures. In addition, the registration detents 126 preferably consist of arcuate holes formed into web 17 in registration with each record 42. It is contemplated that one of the best means to perforate web 17 at the proper detent positions 126 can consist of a group of spikes selectively settable to an operating position. The spikes protrude from a work station and the work station contains detents to engage and register each sheet with respect to the spikes.

Thus, the index holes 127 (noted below) serve the additional function of properly registering each sheet cut from web 17 so it can be perforated with detent opening 126.

Accordingly, cutter strip 58 includes a number of laterally spaced index holes 127 punched therethrough from the back side. The punching serves to raise a cutting edge 128 encircling the hole nearly throughout its entire periphery but leaving an unraised tang portion 129. As thus arranged, strip 58 serves to cut most but not all of the periphery of each hole 127 so as to provide registration openings adapted to be engaged by pins or other means for alignment of the records 42 (FIG. 9) to receive punched or raised detents 126.

Finally, for reasons as will be explained further below, retaining grooves 61, 62 are formed along the edge of body 46 for receiving reaction cables 63, 64.

As noted above, as web 17 emerges from oven assembly 12 in its thermal plastic state, embossing is achieved by feeding web 17 in confronting relation to the embossing portions of stamper plates 47 as the stamper drum assembly 44 carries web 17 through nip 66 defined between the positively driven pressure rollers 67, 68 thereby serving to form impressions in web 17. Roller 67 is coated with a friction surface as is the inside surface of hoop body 46 so as to provide a positive driving friction engagement therewith.

Roller 67 is mounted at each end by means of stub shafts 71 riding in vertical slots 72 formed in downwardly depending support plates 73 carried by crossmember 74 of the frame of the apparatus.

As thus arranged, each end of roller 67 is free to move vertically along its associated slot 72 and at each end means have been provided for applying a constant pressure to the stub shafts 71 as by means of the elongate lever arm 76 pivoted to plate 73 whereby a short bearing surface 77 supports stub shaft 71. Adjustable springs 78 are coupled to the lower end of lever arms 76 at each end, the adjustment being accomplished by the means of nut 79 secured to the righthand (as viewed) vertical frame member 81.

Means for driving stamper drum assembly 44 and web 17 through nip 66 further includes the motor 82 having a gear box 83 and a drive sprocket 84. Sprocket 84 is coupled by means of a chain belt 86 to a relatively small gear 87 fixed to the end of shaft 88 of roller 89. Shaft 88 carries, in addition, another sprocket 91 for driving a chain belt 92 trained about sprocket 91 and a sprocket 93 fixed to the end of shaft 94 for rotating pressure roller 68. At the opposite end of pressure roller 68, a gear 96 meshes with another gear 97 carried on stub shaft 71. Accordingly, the positive rotation of pressure roll 68 serves to positively drive pressure roll 67 by gear 97 so as to drive stamper drum assembly 44 by frictional engagement between roll 67 and the inner surface of drum assembly 44.

Proper web tension is achieved as now to be described.

Upon initially feeding a web 17 into oven assembly 12, rotation of heating drum 23 by means of the cyclic operation of heating belt 26 serves to carry web 117 around drum 23 until it reaches doctor roller 37. Doctor roller 37 discharges web 17 onto the embossing surface of stamper drum assembly 44 where it is fed into nip 66 for embossing.

A clutch 102 serves to engage and disengage gear 98 with respect to shaft 99 so as to couple and decouple the movement of chain belt 101 in driving roller 32 for cyclically moving belt 26.

It is to be observed that movement of belt 26 constitutes the motive force for rotating drum 23 in carrying web 17 to the embossing nip 66. Once, however, web 17 has been engaged by nip 66, web 17 will be continuously drawn by the pulling action occurring at nip 66. Rotation of drum 23 will also continue as will the cyclic operation of belt 26 as web 17 is drawn through nip 66.

The foregoing drive impetus given to rotate drum 23 via web 17 is, however, supplemented by engaging clutch 102 so as to permit chain belt 101 to provide additional direct driving of cyclic heating belt 26. The gear ratios are arranged whereby stamper drum assembly 44 is driven approximately 2½ percent faster than the heating drum 23 so as to introduce a modest tension into web 17 as it approaches the embossing nip 66. In the initial threading or feeding of web 17, clutch 102 can be operated to couple sprocket 98 to shaft 99 so as to positively drive belt 26 and web 17.

Web thickness can be selectively controlled by employing a variable positive drive in place of clutch 102. Such a drive could then increase or decrease the restraint or drag applied to web 17 as it enters nip 66 in thermal plastic state so as to respectively reduce in varying degree the thickness of web 17.

Having just embossed web 17 at nip 66 and while the web is still in a thermal plastic state, means as now to be described serve to maintain web 17 or other plastic substrate under pressure as the web cools so as to permit the web to set up without smearing the records recorded thereon.

Thus, a silicon rubber blanket 103 disposed about idler rollers 104 forms a broad, elongate, resilient blanket trained as a cyclic belt having one "stretch" or "reach" thereof disposed to move about a substantial arcuate portion of the circumference of stamper drum assembly 44, for example, on the order of 288° so as to receive and retain web 17 between the blanket 103 and stamper drum assembly 44.

Means, described further below, serve to press and maintain blanket 103 firmly against web 17 as it travels from nip 66 to exit roller 89.

The action at nip 66, where the embossing takes place, is one of PVC material flow. Considering the micro records as the pattern to be embossed, it can be seen that the negative record formed in the stamper provides raised portions which will enter the warm PVC material. Portions of the PVC material must be displaced sidewise or vertically. The PVC material which moves vertically is readily accommodated by the silicon rubber blanket 103 having a thickness of the order of 0.030 inches to 0.125 inches. Both blanket 103 and PVC of the web are incompressible materials so the apparent vertical motion of the rubber is actually being accommodated mainly by a lateral movement of the rubber. The driving pressure roller 67 will allow some vertical accommodation during embossing.

As pressure increases, the hot PVC has the least flow resistance within nip 66 and will, therefore, move laterally until a balanced force (above the elastic limit) within the materials is reached.

Once the PVC has passed through the embossing pressure rollers and conformed to the stamper, only enough pressure needs to be maintained to retain intimate contact while cooling the PVC to below its restoration temperature which is approximately 170°F, for example.

Once the displacement of plastic has occurred, it must be held in the embossed position until cool to avoid smearing the impression. To accomplish this, the rubber embossing belt 103 is stretched longitudinally around drum assembly 44 between the embossing rollers 68, 67 and the exit roller 89 (approximately 270°). Tensioning of blanket 103 occurs primarily at nip 66 and is maintained by capstan action around drum assembly 44.

Further, however, cyclic metal band means are disposed to span the width of blanket 103 and extend along the same portion of drum assembly 44 as covered by blanket 103.

The cyclic band means comprises a number of narrow metal bands 107 arranged in side-by-side relation to pass around roller 68 while lying behind blanket 103 during that stretch of its cyclic operation between roller 68 and exit roller 89. Thus, bands 107 are trained about a number of idler rollers 104 as well as exit roller 89.

Means for tensioning each of the bands 107 independently of the others comprises the two groups of compliance arms 108, 109 carrying on their ends pulleys 111, 112 respectively. Spring means such as the individual springs represented by the downwardly acting spring 113 and the leftwardly acting spring 114 are carried by the upright support member 116 of the frame. Accordingly, each compliance arm 108, 109 is pivoted under a spring force to urge its associated pulley 111, 112 against an associated one of the bands 107. In this way, tension is introduced into the bands so as to press directly against the back of blanket 103.

The foregoing arrangement serves to retain blanket 103 firmly against the surface of stamper drum assembly 44 whereby, during cooling of web 17 (as it engages the embossed surface of assembly 44), the web will not slip laterally or longitudinally of the drum surface, since blanket 103 is under constant tension derived from the pressure at nip 66.

The pressure between rollers 67, 68 causes a bulge 70 to form in the material of blanket 103 which serves to generate a restraining force to movement of blanket 103 through nip 66. This action serves to introduce tension into blanket 103.

More particularly, the coefficient of friction between bands 107 and blanket 103 is greater than between the bands 107 and roller 68. This arrangement serves to tighten the bands.

It has been observed that the plurality of individual narrow bands 107 described above accommodate local "bumps" or deformations including the embossed record images found upon the surface of drum assembly 44 without relieving the pressure applied by adjacent bands. Further, the bands, being independently arranged and trained about idlers 104 in a manner now to be described, serve to prevent blanket 103 from creeping axially on drum assembly 44 during operation.

Figure 4:
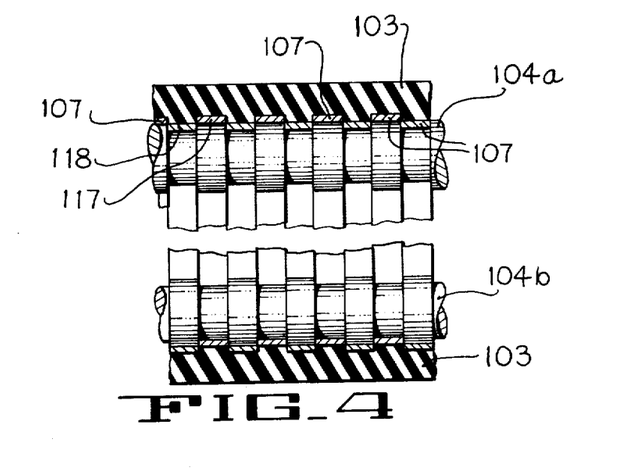
FIG. 4 shows in enlarged detail diagrammatic section taken along the line 4—4 of FIG. 10 and showing a mid-span portion of the belting disposed about the embossing drum according to the invention.

Accordingly, as best shown in FIGS. 4 and 10, idlers 104*a* and 104*b* represent successive stations in the cyclic path of bands 107 and blanket 103. In order to keep blanket 103 from creeping, each of the idler rolls 104 has been provided with alternately occurring lands and grooves 117, 118. As can be observed in FIG. 4, a given band 107 passes from the land of one idler 104 to the groove of the next idler in its path and then returns to a land of the next succeeding idler. Accordingly, the individual bands pass alternately from grooves to lands of successive idlers throughout the passage around the circumference of assembly 44 for approximately 288°. However, bands 107 all lie in the same plane as they pass around rollers 68, 89. From the foregoing, it will be readily evident that the bands 107 will tend to attempt to move the freely rotatable drum assembly 44 upwardly through the gap defined between rollers 68, 89. However, reaction cables 63, 64 trained about their respective pulleys 121, 122 and sheaves formed in the ends of rollers 68, 89 and lying in grooves 61, 62 (FIG. 5) all serve to provide a reaction means against which the drum can rotate.

As noted above, reaction cables 63, 64 serve to engage and restrain drum assembly 44 from shifting upwardly through the gap defined between rollers 89 and 68. As thus arranged, hoop body 46 is tightly "contained" within the moving bands 107 which, in view of the fact that the bands 107 and cables 63, 64 subject hoop 46 to an encircling compressive force (which can be more easily supported), permits the bands 107 to apply very high pressure to blanket 103 and drum 44.

From the foregoing, it should be readily evident that there has been provided an improved record press for duplicating pre-recorded records following the steps of continuously moving while pre-heating a thermal plastic web to receive records applied thereto, impressing the moving web using a prerecorded negative image of the record to be applied to the web while backing the web with a layer of resilient material serving to accommodate displacement of web material in the region of the records as they are pressed into the web. The further step of wrapping the resilient material to travel in a cyclic path having a web-retaining portion traveling with the surface of a freely rotatable cooling drum carrying the pre-recorded negative images and then leading the web to travel partially about the cooling drum throughout the web-retaining portion so as to retain the web to the drum during setting of the material of the records on the web. Finally, non-resilient, cyclic bands are applied under tension to press against the web via the material of the blanket substantially throughout its travel in that portion of its cyclic path including a contiguous relationship with respect to drum assembly 44. Rotating the drum withdraws the tape.

Accordingly, it will be readily evident that there is provided an improved, efficient system for duplicating pre-recorded records. The only heat lost is the heat applied to the web since the environment of the stamper drum assembly 44 preferably remains in a cool enough state to cause relatively quick setting of the thermal plastic web.

As generally referred to above, a record 42 of the type impressed upon web 17 will later be associated with detents 126 punched through substrate 124 whereby a pair of downwardly extending pins 131 of and schematically representing a hand-held playback machine of the type, for example, as shown in our co-pending application, Ser. No. 347,841, can engage detent openings 126 and thereby register the pick-up transducer of such playback device with respect to the starting point of the track forming record 42.

Figure 11:
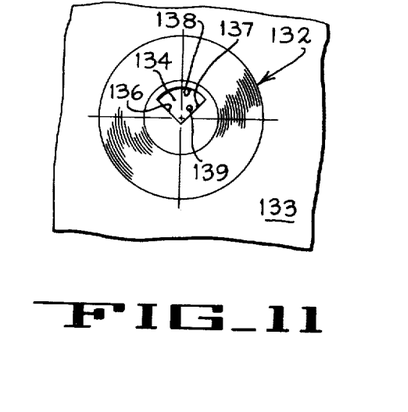
FIG. 11 shows in plan view another embodiment of a pre-recorded record format for use in conjunction with a hand-held playback unit.

FIG. 11 discloses another embodiment of a pre-recorded record 132 of a type formed with a microgroove track of predetermined length disposed in spiral configuration pressed into a substrate 133 of recording material, such as PVC plastic. Record 132 includes an index opening 134 disposed centrally of record 132. Index opening 134 serves to register a playback transducer of the kind referred to above (but having only a single downwardly protruding index pin 139) with respect to the start of the spiral track of record 132 as now to be described.

Opening 134 forms substantially an isosceles triangle with the angle defined between the equal sides 136, 137 being disposed centrally of the record configuration. Preferably this angle is 90°. Side 138 opposite the angle noted above forms a bounding surface connecting the ends of the other two sides 136, 137 thereby defining the limits of the opening 134. Sides 136, 137 are adapted to engage and guide the downwardly protruding index pin 139 of a playback device into the angle defined between sides 136, 137 to register the pickup transducer with respect to the track of record 132.

Figure 12:
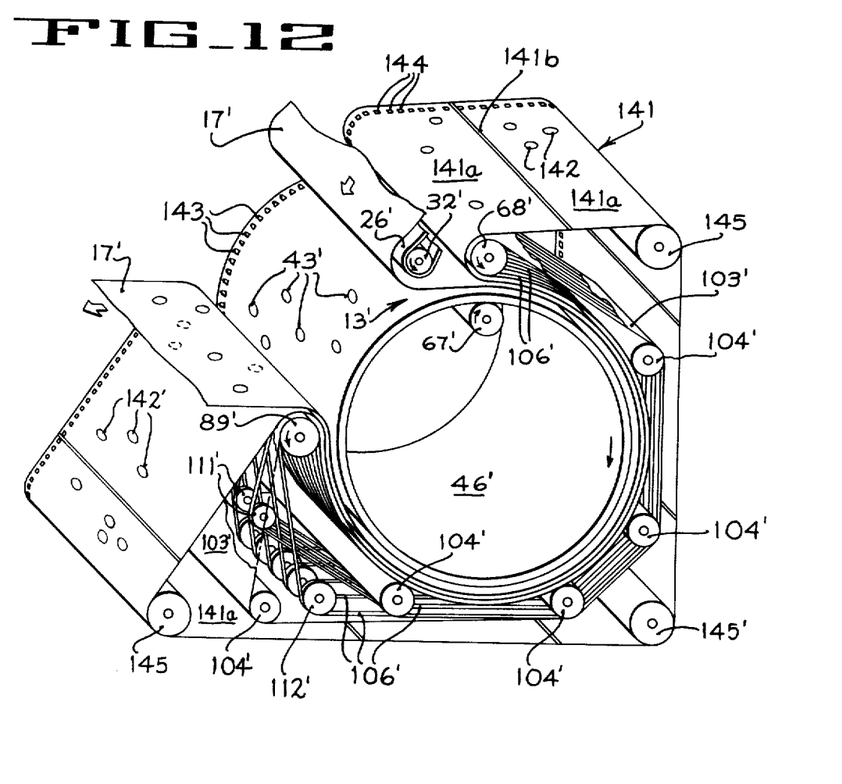
FIG. 12 shows a view similar to FIG. 1 but with portions removed for clarity and with the inclusion of additional cyclic apparatus for embossing both sides of a substrate of material simultaneously.

Another embodiment of the press described above is now to be described with respect to the schematic diagram shown in FIG. 12 which is generally similar to many portions of the press schematically represented in FIG. 1 (and shown in detail in the remaining Figures).

The embodiment shown in FIG. 12 is particularly adapted to press records onto both sides of web 17' or other substrate such as individual sheets fed via nip 13'.

In the arrangement shown in FIG. 12, a cyclically trained stamper belt assembly 141 comprises a plurality of interconnected flexible stamper panels 141*a*, each having an embossing surface thereon carrying a selected arrangement of negative images 142 disposed and adapted to be pressed downwardly against the top surface of web 17' (or other substrate) as it passes through nip 13' by means of pressure rollers 57', 68'. Panels 141*a* are fused or welded in tandem relationship as represented by the lines 141*b* to form a closed loop belt 141.

The rotatable drum body 46' serves to carry web 17' while retained thereagainst by bands 106' of a type and arranged all as previously described.

Means for coupling belt assembly 141 to move with drum 46' comprises the sprocket teeth 143 and sprocket openings 144 forming a line of perforations along one margin of belt 141. In addition, guide rollers 145 along with guide rollers 89' and 68' serve to train belt assembly 141 to travel with its embossing surface disposed in confronting relation to drum 46'. Web 17' is interposed between drum 46' and belt 141 so as to receive impressions from belt 141 as well as from drum 46'.

Accordingly, by utilizing either the stamper drum 46 or the stamper belt 141, one or the other side of web 17' can be impressed with records or as is the more usual circumstance, both sides of web 17' can be impressed with records so as to provide a leaf of a book to be used in association with written or braille material.

As thus arranged, the embodiment shown in FIG. 12 stamps both sides of web 17' using substantially the same principles as described above.

Accordingly, it will be observed that bands 106' maintain pressure against the rubber blanket 103' which serves to maintain web 17' firmly and securely urged against embossing drum 46'. At the same time bands 106 press the cyclically moving stamper belt 141 similarly into web 17' whereby web 17' is essentially locked in a sandwiched condition between the stamper surfaces of drum 46' and of belt 141.

In view of the fact that web 17' is being pressed from both sides, it has been observed to be advantageous to employ a slightly thicker plastic material than noted at the outset above and possibly even to increase the temperature of the plastic web 17' or pressure at the embossing rollers 67', 68' so as to permit web 17' to accommodate displacement of material on its opposite surfaces.

It has further been observed that the presence of stamper belt 141 interposed between blanket 103' and web 17' does not isolate web 17' from the holding and maintaining action described earlier above with respect to blanket 103.

We claim:

1. In a press for continuous pressing of pre-recorded records onto a substrate of thermal plastic material, a stamper drum having pre-recorded negative images of records thereon, said stamper drum being mounted for rotation for carrying said substrate therearound, means for uniformly heating said substrate, means for directing the substrate from the last named means onto said stamper drum for travel therewith, means including an elongate, resilient blanket serving to compress the heated substrate to said stamper drum to form images in said substrate of the stamper records, resilient, cyclic belt means, including said resilient blanket, having one stretch thereof trained in a predetermined cooling path to travel with the periphery of said drum in said cooling path while retaining said substrate compressed against and motionless with respect to the stamper surface of the drum, said cooling path being sufficiently long and said drum sufficiently heat absorptive to cause said images to become set during their transit of said cooling path.

2. In a press for continuous pressing of pre-recorded records onto a substrate of thermal plastic material according to claim 1 in which said heating means includes an oven enclosure, a rotating heat-transmissive drum within said enclosure, heating means within the drum for heating same during rotation of the drum, a cyclic belt having one stretch thereof trained in a predetermined heating path to travel with the periphery of the last named drum while retaining said substrate urged toward and into heat-transfer relation with the heating drum so as to uniformly heat the substrate by receiving heat from the drum and from its surrounding environment.

3. In a press according to claim 1 further including means carried by said drum and protruding from the outer surface thereof for perforating index openings into said substrate at predetermined intervals along said substrate, said openings being distributed and adapted to be engaged by detents for registration of said records with respect to other components thereof.

4. In a press for continuous pressing of pre-recorded records according to claim 2 further comprising means for feeding said substrate into said enclosure and between said heating drum and the heating belt, and means for disengaging said substrate from said heating belt and for directing the substrate onto said stamper drum.

5. In a press for continuous pressing of pre-recorded records according to claim 1 wherein said cyclic belt means further includes cyclically moving substantially inelastic bands disposed to move with and press firmly against said blanket and said substrate as they travel along said predetermined cooling path.

6. In a press for continuous pressing of pre-recorded records onto a substrate of thermal plastic material from negative images thereof carried by an embossing means, a heating drum freely rotatable to receive a substrate of said material therearound, an embossing drum freely mounted and rotatable for receiving the heated substrate from said heating drum and formed on the surface thereof with negative images of said records to be applied to said substrate, a broad, cyclic belt having a stretch thereof disposed to move about a substantial arcuate portion of the circumference of the heating drum to receive and retain the substrate between said belt and drum, a broad, elongate, resilient blanket trained as a cyclic belt having a stretch thereof disposed to travel with a substantial arcuate portion of the circumference of the embossing drum to receive and retain the substrate between said blanket and said embossing drum, cyclic band means disposed to span the width of said blanket and extending along said portion of the circumference of the embossing drum, said band means being disposed in said portion to press said blanket toward said embossing drum, means for tensioning said band means tightly against said blanket, means for rotating said embossing drum and said heating drum respectively while drawing the substrate therearound, means for driving said band means, and means forming a nip embracing and passing said band means, blanket and embossing drum in overlaid relation, said nip acting conjointly with driving of said band means and said embossing drum to apply a substantially uniform tension to said blanket while riding against said substrate disposed between said drum and blanket.

7. In a press for continuous pressing of pre-recorded records onto a substrate of thermal plastic material according to claim 6 wherein the last named said stretch extends sufficiently to permit said blanket and drum to absorb sufficient heat from the substrate to cause the embossed records thereof to set up while applying uniform tension to said substrate throughout passage thereof along the last named said stretch.

8. In a press for continuous pressing of pre-recorded records according to claim 6 further including clutch means for selectively driving said heating drum via its heating belt for threading a substrate therebetween.

9. In a press for continuously pressing pre-recorded records onto a substrate of thermal plastic material, means forming a cyclically moving embossing surface carrying negative images of pre-recorded records to be applied to said substrate, means for heating and carrying said substrate to said embossing surface, means for pressing said substrate and said embossing surface together to apply records to said substrate, means for maintaining the substrate in secure registration contact with the embossed negative images carried on said embossing surfaces to prevent smearing the record while simultaneously cooling the substrate by transfer of heat from the substrate to said embossing surface.

10. In a press according to claim 9 further comprising a rotatable drum and embossing means secured to the outer peripheral surface thereof to provide said means forming a cyclically moving embossing surface.

11. In a press according to claim 9 further in which the first named said means comprises a cyclically trained belt of interconnected flexible stamper panels, each said panel having an embossing surface thereon, a rotatable drum serving to carry said substrate therearound, means supporting said belt to travel with its embossing surface disposed in confronting relation to said drum with said substrate interposed between said drum and said belt to receive impressions from said belt.

12. In a press for continuously pressing pre-recorded records onto a substrate of thermal plastic material, a cyclically moving embossing drum assembly carrying negative images of pre-recorded records to be applied to said substrate, means for heating and carrying said substrate to said embossing drum, a cyclically trained belt of interconnected stamper panels of flexible metal, each having an embossing surface thereon carrying negative images of pre-recorded records to be applied to said substrate, means supporting said belt to travel with its embossing surfaces disposed in confronting relation to said drum with said substrate interposed between said drum and belt, means for pressing said substrate and said embossing surfaces of both said drum and said belt together to apply records to both sides of said substrate, means for maintaining the substrate in secure registration contact with the embossed negative images carried on both said drum and said belt to prevent smearing records while simultaneously cooling the substrate by transfer of heat from the substrate to said drum and belt.

13. In a press according to claim 12 wherein said means for maintaining the substrate in secure registration contact comprises cyclic belt means, including an elongate, resilient blanket having one stretch thereof trained in a predetermined cooling path to travel with the periphery of said drum and belt in said cooling path while retaining said substrate compressed against and motionless with respect to the stamper surfaces of the drum and belt, said cooling path being sufficiently long and said drum sufficiently heat absorptive to cause images to become set during their transit of said cooling path.

* * * * *